US007788687B1

(12) United States Patent
Conrad et al.

(10) Patent No.: US 7,788,687 B1
(45) Date of Patent: Aug. 31, 2010

(54) PUSH ADVERTISING MODEL USING MULTIPLE DIGITAL STREAMS

(75) Inventors: Clay Conrad, Half Moon Bay, CA (US); Alain Delpuch, Courbevoie (FR); Joel Zdepski, Mountain View, CA (US); Vincent Dureau, Palo Alto, CA (US); Steven Szymanski, Mountain View, CA (US)

(73) Assignee: OpenTV, Inc., San Francisco, CA (US)

( * ) Notice: Subject to any disclaimer, the term of this patent is extended or adjusted under 35 U.S.C. 154(b) by 2045 days.

(21) Appl. No.: 10/399,724

(22) PCT Filed: Oct. 18, 2000

(86) PCT No.: PCT/IB00/01631

§ 371 (c)(1), (2), (4) Date: Nov. 20, 2003

(87) PCT Pub. No.: WO02/33970

PCT Pub. Date: Apr. 25, 2002

(51) Int. Cl.
*H04N 7/10* (2006.01)
*H04N 7/025* (2006.01)

(52) U.S. Cl. .................. 725/36; 725/32; 725/33; 725/34; 725/35

(58) Field of Classification Search .......... 725/32–36
See application file for complete search history.

(56) References Cited

U.S. PATENT DOCUMENTS

| 5,155,591 | A | * | 10/1992 | Wachob | 725/35 |
| 5,319,455 | A | | 6/1994 | Hoarty et al. | |
| 5,424,770 | A | * | 6/1995 | Schmelzer et al. | 725/36 |
| 5,600,366 | A | * | 2/1997 | Schulman | 725/36 |
| 5,892,535 | A | * | 4/1999 | Allen et al. | 725/36 |
| 6,253,189 | B1 | * | 6/2001 | Feezell et al. | 705/14 |

(Continued)

FOREIGN PATENT DOCUMENTS

EP 0 424 648 9/1990

(Continued)

*Primary Examiner*—Brian T Pendelton
*Assistant Examiner*—Nnenna N Ekpo
(74) *Attorney, Agent, or Firm*—Rory D. Rankin; Meyertons, Hood, Kivlin, Kowert & Goetzel, P.C.

(57) ABSTRACT

A method and mechanism for selecting and conveying ads in an interactive television system. An ad stream is conveyed concurrently with a broadcast programming stream in an interactive television system. The ad stream includes multiple streams of ads wherein each stream of ads includes multiple ads. An ad selector mechanism detects programming and ad requests. Requests may be indicated by a viewer, a received cue, or by an interactive application. Based on programming and ad selection data, a viewer profile is created which may be used to select targeted ads for display. In response to a detected request, the ad selector mechanism searches the ad stream for an ad to meet the request. An ad is selected according to a viewer profile or a particular viewer action. The selected ad may be used to meet the request by filling an unused avail or by providing further information to a viewer. A particular ad may appear in more than one of the multiple streams and at different start times. Additionally, a particular ad may appear multiple times in a single stream. The multiple appearances of a particular ad offers multiple possible start times for the ad.

47 Claims, 12 Drawing Sheets

U.S. PATENT DOCUMENTS

| | | | |
|---|---|---|---|
| 6,266,519 B1 * | 7/2001 | Eguchi et al. | 455/185.1 |
| 6,487,721 B1 * | 11/2002 | Safadi | 725/36 |
| 6,530,082 B1 | 3/2003 | Del Sesto et al. | |
| 6,698,020 B1 * | 2/2004 | Zigmond et al. | 725/34 |
| 6,826,534 B1 * | 11/2004 | Gupta et al. | 705/1 |
| 7,039,932 B2 * | 5/2006 | Eldering | 725/35 |
| 7,051,351 B2 * | 5/2006 | Goldman et al. | 725/34 |
| 2002/0055880 A1 * | 5/2002 | Unold et al. | 705/26 |

FOREIGN PATENT DOCUMENTS

| | | |
|---|---|---|
| EP | 0 784 405 | 4/2003 |
| WO | WO 89/09528 | 10/1989 |
| WO | WO 95/15658 | 6/1995 |
| WO | WO 96/08109 | 3/1996 |
| WO | WO 98/37696 | 8/1998 |
| WO | WO 99/66726 | 12/1999 |
| WO | WO 0049801 * | 8/2000 |
| WO | WO 0049801 A1 * | 8/2000 |

* cited by examiner

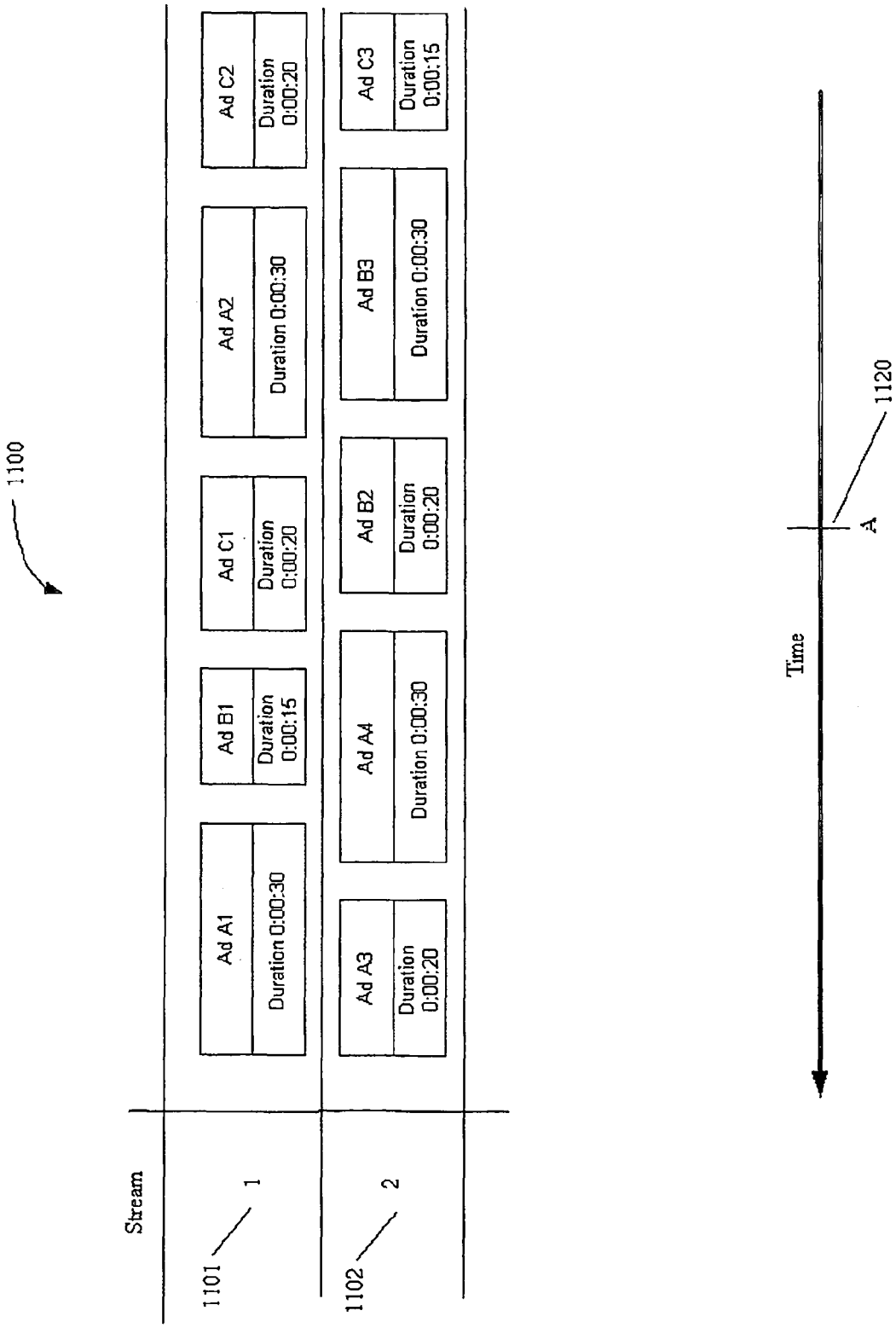

PUSH ADVERTISING MODEL USING MULTIPLE DIGITAL STREAMS

BACKGROUND OF THE INVENTION

1. Field of the Invention

The invention relates generally to broadcast television systems and more particularly to a system and method for delivering and selecting advertising.

2. Description of Related Art

Broadcast television systems convey television programming to homes throughout the world. In addition to television programs, broadcasters also convey advertisements and other promotions. Typically, network providers convey programs and advertising to local broadcasters who in turn convey the programs and advertising to a local television audience. In some cases, network providers make a certain amount of time available to the local broadcaster for local advertising. These time slots made available by the network to the local broadcaster are sometimes referred to as "avails". The local broadcaster may then sell this time to advertisers who wish to promote their products or services to the local television viewing audience. Generally, the local broadcaster detects an avail in the network broadcast signal via a tone cue and may then insert their local advertisement in the programming signal which is broadcast to the local audience. If the local advertiser does not sell or give an avail to an alternate advertiser, the advertisement conveyed by the network is broadcast to the local audience.

Interactive television systems provide a means to deliver interactive content as well as ordinary television audio and video to a large number of subscribers. Programs broadcast by these systems may incorporate television audio and video, still images, text, interactive graphics and applications, and many other components. The interactive content of the interactive television signal may therefore include application code, data associated with the audio and video, control signals, raw data and many other types of information. Both the interactive content and the audio and video data are delivered to subscribers as "pushed" data. That is, the data is delivered to each of the subscribers, regardless of whether or not the subscribers requested the data.

Interactive content such as application code or information relating to television programs is usually broadcast in a repeating format. In other words, each piece of information is broadcast a first time, then each is transmitted a second time, and so on. The cycle is repeated so that each piece of interactive data is transmitted, for example, every ten seconds. The pieces of information which are broadcast in this manner form what is referred to as a "carousel." Frequently, a single carousel is transported as a contiguous data stream. However, it is also possible to multiplex two or more carousels in a single data stream.

Broadcast systems (e.g., interactive television systems) transmit information in a carousel format in order to allow receivers in the system to selectively obtain particular pieces of information in the carousel without requiring a return path from the receivers to the server. If a particular receiver needs a particular piece of information, it can simply wait until next time that piece of information is broadcast, and then extract the information from the broadcast data stream. Other receivers in the system can operate in the same manner, each receiver waiting for the information it needs, and then using only that information. By employing carousels to broadcast information, the system eliminates the need to connect each of the receivers with the server and further eliminates the need for the server to process individual requests for information.

Generally, a broadcast signal may include a number of programs which in turn may include a number of audio/video streams and/or data streams. Data streams may be used to carry data such as interactive application data, subtitle information, or other data.

The pieces of information, or data objects, in a carousel may be intended to be combined in a single object data stream to form a program. This program may also contain streaming data such as audio or video. For example, an interactive television game show may combine television audio and video with interactive content such as application code which allows users to answer questions. Another example would be a news program which combines audio and video with application code that inserts current stock prices in a banner at the bottom of the screen. (It should be noted that many types of programs are possible, and it is not necessary to include either audio, video or interactive content any particular program. A program might contain only audio and interactive data (e.g., an interactive radio program,) or it might contain only interactive data (e.g., an interactive weather program that does not contain audio or video streams.) Typically, each program is associated with a corresponding channel and, when a channel containing a particular program is selected by the interactive television receiver, the data which is being broadcast on that channel is downloaded and the program is started.

As discussed above, advertising is also conveyed to the television viewing audience with avails provided by the network to the local broadcaster. Avails which are unused by the local broadcaster may simply convey the network provided advertisements. Consequently, unused avails may be a source of lost revenue for the local broadcaster. Further, because avails begin at a specific time and have a specific duration, the system of providing avails to local broadcasters who then insert local advertising requires very strict timing. Consequently, the people and/or equipment required to adhere to these strict timing requirements may be very costly. In addition, in an interactive television environment, viewers may interact with ads or promotions at times which may not correspond to the predetermined timing of the avails. Consequently, advertisers are not able to effectively provide ads to viewers on an interactive basis.

Additional complications arise when advertising in the context of interactive television. Frequently, an application provider creates an application which includes a number of viewable pages. If desired, the provider may create "slots" within a page, or pages, which is designed to accommodate an advertisement. Typically, an agreement is made between the application provider and an advertiser to include a particular ad banner in a slot on a particular page of the application. Further, some means of ensuring that particular ads have been run and providing that information to the advertiser is necessary in order to properly manage the financial accounting associated with the agreement. Because an application provider may have a number of such agreements for each application, managing the advertising aspects of an application and their corresponding agreements can quickly become unduly cumbersome. Further, when a viewer uses the same application repeatedly, the same banner ad is seen over and over. In addition to these problems, an efficient method of accounting for which ads have been run and conveying that accounting information to the advertiser is needed.

SUMMARY OF THE INVENTION

One or more of the problems outlined above may be solved by various embodiments of the invention. One embodiment is a method which includes concurrently receiving a programming stream and an ad stream. Upon detecting a request for an ad, an ad within the ad stream which corresponds to the request is identified. Subsequently, the identified ad is selecting and conveyed.

Also contemplated is a device which includes a signal receiver and an ad selector mechanism. The signal receiver is configured to receive a programming signal and a plurality of ads concurrently. The ad selector is coupled to the signal receiver and is configured to detect a request for an ad, identify a first ad of the plurality of ads in response to detecting said request, where the first ad corresponds to detected request, select and convey the identified ad.

Further contemplated is a carrier medium comprising program instructions which are executable to receive a programming signal and a plurality of ads concurrently, detect a request, identify a first ad of said plurality of ads in response to detecting said request, select said first ad, and convey said first ad.

Still further contemplated is a method comprising conveying a programming signal, conveying a plurality of ads, wherein said plurality of ads are conveyed concurrently with said programming signal, receiving viewer selection data, and creating a viewer profile, wherein said viewer profile is created utilizing received viewer selection data.

BRIEF DESCRIPTION OF THE DRAWINGS

Other objects and advantages of the invention will become apparent upon reading the following detailed description and upon reference to the accompanying drawings in which:

FIG. 4A is a diagram illustrating an ad stream.

Figure 1:
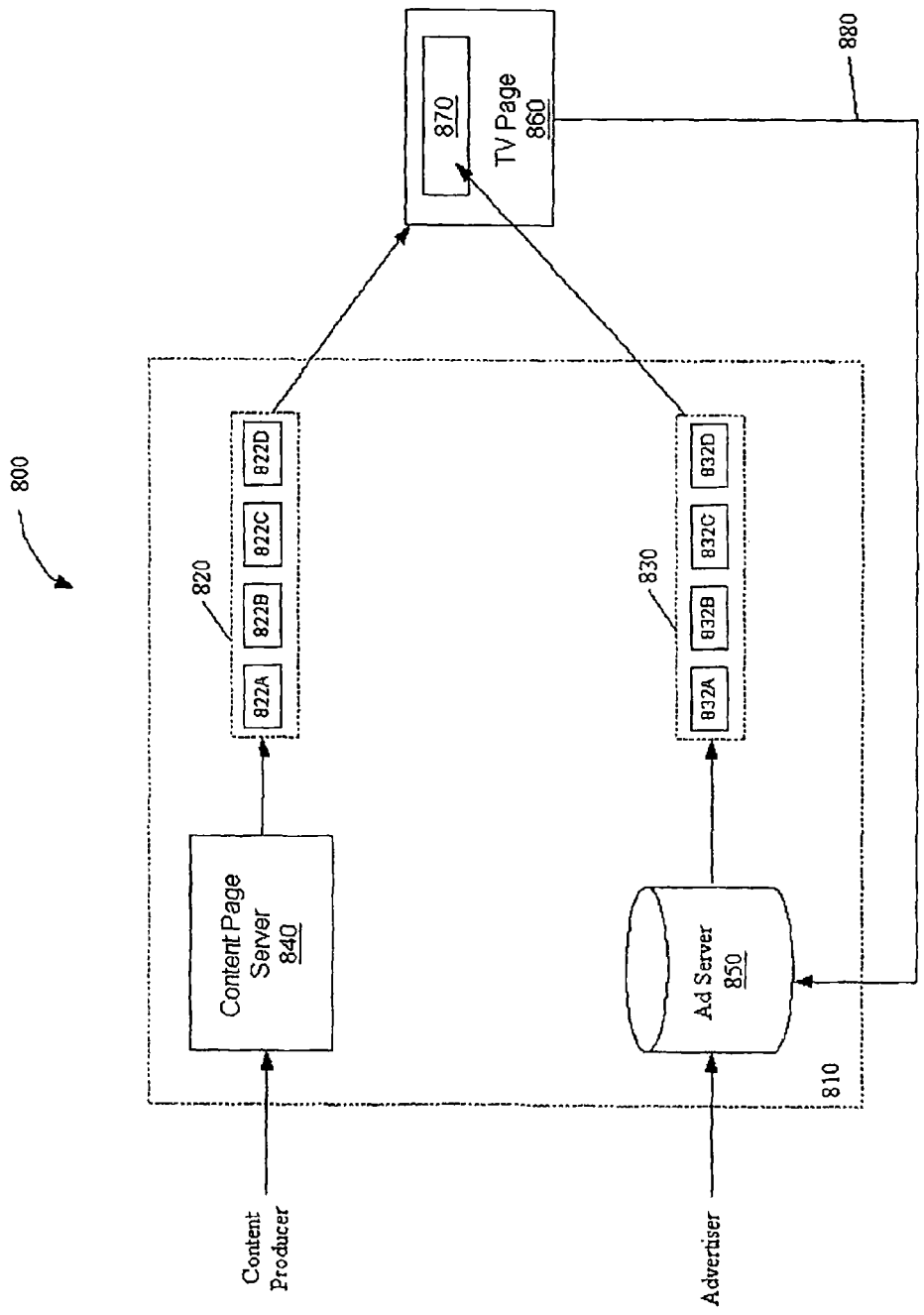
FIG. 1 is a diagram of an ad delivery system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Overview

FIG. 1 is an overview of one embodiment of a system in which ads are inserted in a television page. Included in the system 800 of FIG. 1 are a broadcast station ("headend") 810, content page server 840, ad server 850, page carousel 820, ad carousel 830, television page 860, banner ad 870, and return path 880. Content page server 840 includes data which may form a television page 860. Such data may include audio, video, still images, or other material appropriate for presentation to a viewer. In the embodiment of FIG. 1, pages 822A-822D are conveyed as a carousel 820. Ad server 850 includes a number of ads which are conveyed and presented in conjunction with television page 860. Ads also may include audio, video, still images, or other material appropriate for presentation to a viewer. In the embodiment of FIG. 1, ads 832A-832D are conveyed as a carousel 830. Also included in system 800 is a return path 880 for conveying information from the viewer back to the headend 810.

In one embodiment, television page 860 is designed to accommodate advertising. For example, such an accommodation may take the form of a "slot" which may be filled by an ad. In an exemplary embodiment of system 800, rather than inserting ads into pages at the headend based on cues, ad insertion is accomplished at the point of final presentation. For example, ad insertion may be finally accomplished by a set top box in a viewer's home. Further, if ad carousel 830 includes a variety of different types of ads 832A-832D, the ad 870 which is selected for insertion into page 860 may be selected according to a particular viewer profile. In one embodiment, viewer programming and ad selections may be stored and used in creating a viewer profile. For example, a viewer may have a set top box which contains a storage device such as a hard drive. Viewer selection data may be stored in the storage device and periodically conveyed to the headend where a viewer profile is generated. The created viewer profile may then be transmitted from the headend to the viewer's set top box where it is downloaded and used to selected ads which are better targeted to that particular viewer. Alternatively, viewer selection data which is stored may be used in selecting ads for display. In one embodiment, ads 832A-832D are tagged with information which may matched to particular user profiles. Information corresponding to a particular viewer may also be conveyed back to the headend 810 via return path 880. Also, utilizing the information returned via path 880, "ad tracking" may be accomplished where the ads which have been presented may be tracked. In this manner, ad server 850 may serve as a central tracking repository. Further, information returned via path 880 may be used to schedule which ads are to be conveyed via ad server 850.

Such a system 800 described above presents numerous advantages. By moving ad insertion from the headend to the point of presentation and selecting ads based on end user profiles, ad insertion equipment costs may be reduced at the headend and ads may be more effectively targeted to particular viewers. Further, by carefully tracking ads which have been presented and returning that information via return path 880 to a central repository, accounting is better facilitated. In addition, by utilizing information returned via path 880, ads conveyed via carousel 830 may be more appropriately scheduled and better ad targeting may be achieved.

Ad Brokering

One of the tasks generally required in matching ads to particular applications or television pages is that of forming agreements between an advertiser and the application provider. Generally, an content provider forms an agreement with a particular advertiser to present that advertiser's ad on one or more of the content provider's pages. For example, the producer of a sports oriented television page may form an agreement with an athletic shoe maker to present an ad for the shoe maker on one of its pages. In addition, an agreement may be formed with a sports drink maker to display their ads on a particular page, and so on. In the end, many such agreements may be formed which require management.

Figure 2A:
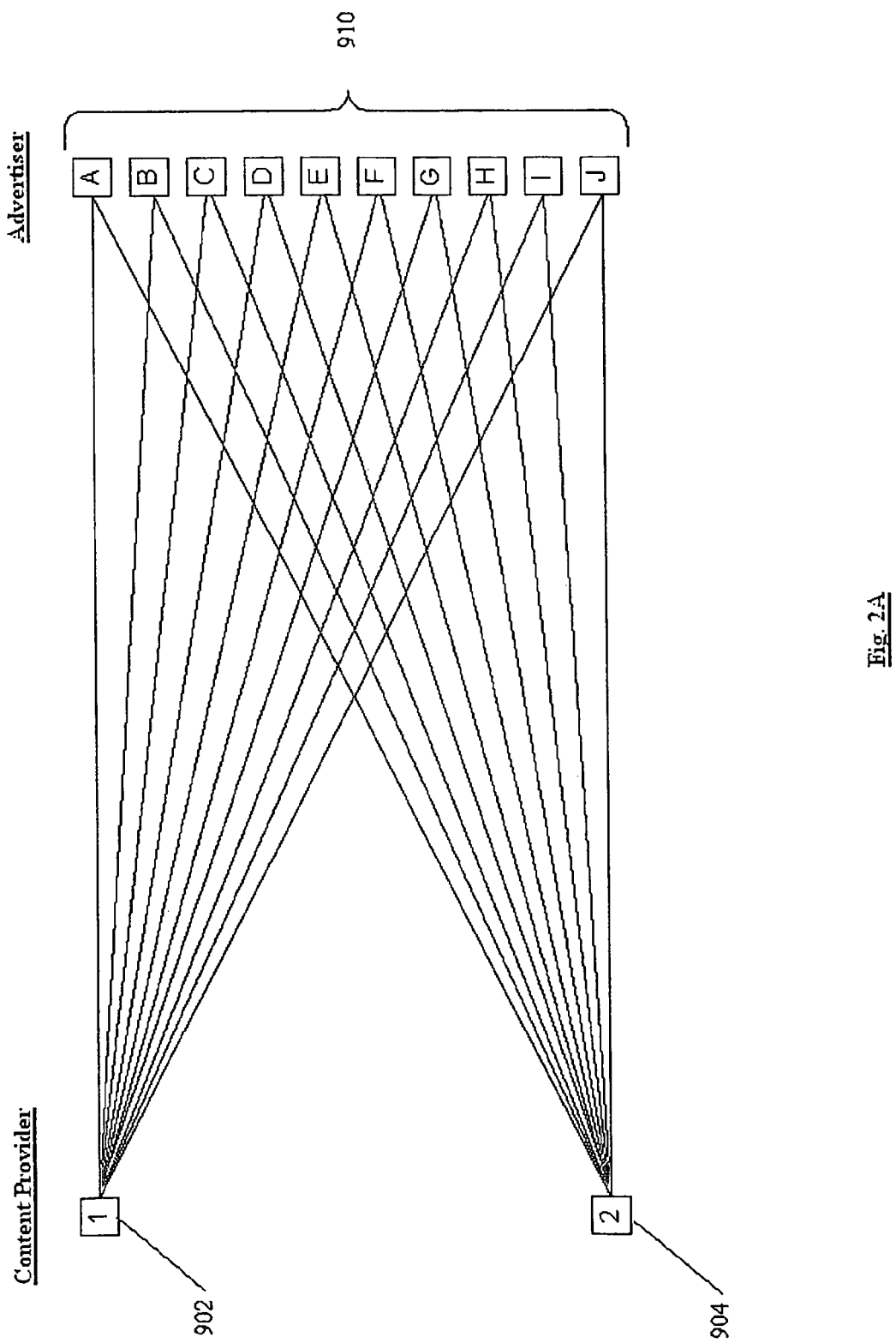
FIG. 2A is an illustration of ad agreement formation.

FIG. 2A is an illustration of agreements which may be made between content providers and advertisers. FIG. 2A includes two content providers, 902 and 904, and ten advertisers 910. Each content provider makes an agreement with each of the advertisers to include their advertising within their page. Consequently, twenty total agreements are made. In general, assuming each content provider has an agreement with each advertiser, the total number of agreements made will equal the product of the number of providers and advertisers. In the case of FIG. 2A, the total number of agreements is 2 times 10, or 20 agreements. If there are 1000 advertisers and 1000 content providers, then there are potentially 1,000,000 separate agreements which must be made and managed. Frequently, such agreements require the content provider to inform the advertiser when their ads have run. Therefore, each content provider is responsible for tracking and reporting to each individual advertiser with which they have an agreement. Because the number of agreements can quickly become very large, this method of establishing agreements may quickly become unwieldy.

Figure 2B:
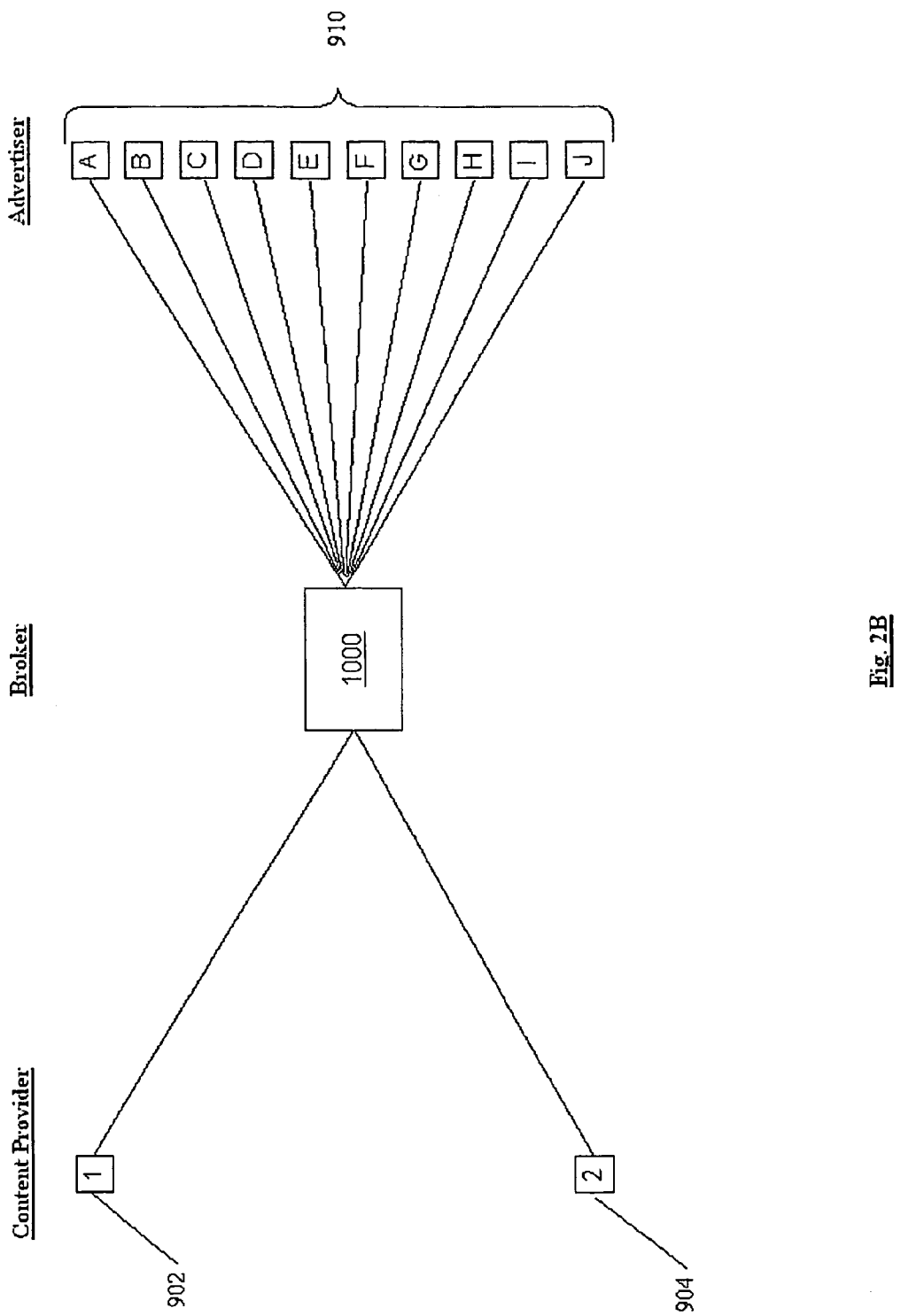
FIG. 2B is an illustration of ad brokering.

In order to facilitate a more efficient method of creating and managing agreements, an "ad broker" may be used. FIG. 2B illustrates how an ad broker may be utilized to improve the way agreements are made and managed between content providers and advertisers. As in FIG. 2A, two content providers, 902 and 904, and ten advertisers, 910, desire to form agreements. Rather than forming agreements directly with each other, a "broker" 1000 is used as an intermediary. Broker 1000 forms an agreement with each advertiser 910 to act as an intermediary for those wishing to form an agreement with one of those advertisers 910. Likewise, broker 1000 forms an agreement with each content provider to act as an intermediary for those wishing to form an agreement with those content providers, 902 or 904. Consequently, the total number of agreements is reduced to the sum of the number of content providers and advertisers. In this case, a total number of twelve agreements are formed, rather than twenty. In one embodiment, ads which are the subject of agreement are made part of an ad server database, such as ad server 850.

For example, each of advertisers 910 may desire to advertise on a page corresponding to content provider 902 and may request that broker 1000 contact provider 902 and establish an agreement. Broker 1000 may then contact content provider 902 who may then agree to include the advertising of advertisers 910. Broker may then establish, in communication with provider 902 and advertisers 910, how and when the advertising may be included by provider 902. For example, each run of a particular ad may have a corresponding fee. In one embodiment, provider 902 may simply track which ads are run on its pages and convey that information to broker 1000. Broker may then compile run information for each of the advertisers who then may be required to pay the corresponding fees. Alternatively, an advertiser may pay a fee to have particular ads run more often that others. Clearly, many fee arrangements are possible and are contemplated. Advantageously, the total number of agreements which must be formed is reduced. Further, information related to the tracking of ad runs may be conveyed from the content provider to a single entity, the broker 1000, rather than each advertiser. Likewise, advertisers 910 may obtain information related to the run of their ads from a single source.

Figure 3:
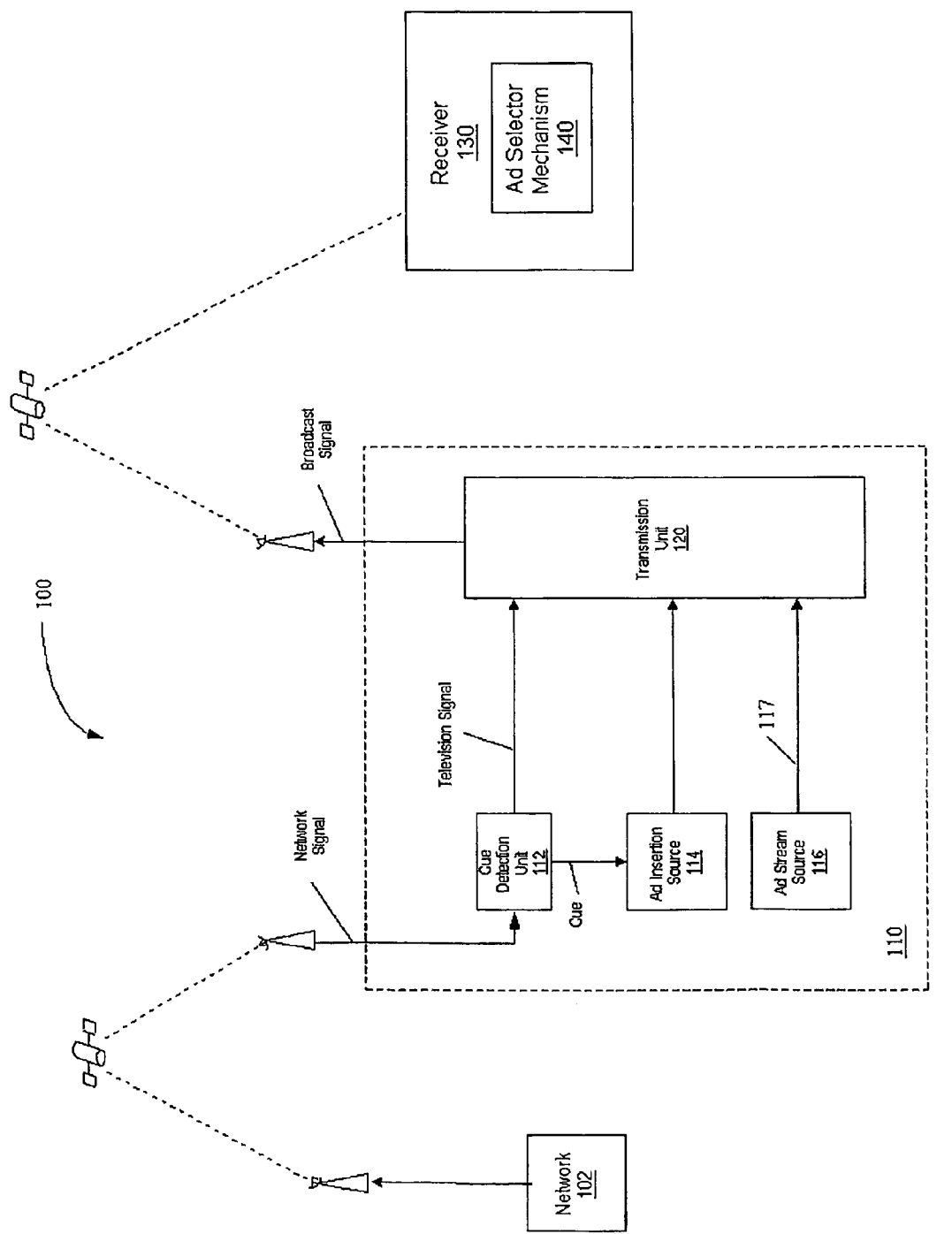
FIG. 3 is a block diagram of a television system.

Turning now to FIG. 3, a block diagram illustrating one embodiment of a television broadcast system 100 is shown. The system 100 of FIG. 3 includes a remote network 102 for transmitting a television signal via satellite, a broadcast station 110 which receives the television signal, and receiver 130 which receives a signal transmitted by broadcast station 110.

In the embodiment shown, broadcast station 110 includes cue detection unit 112, ad insertion source 114, ad stream source 116, and transmitter 120. Receiver 130 includes ad selector mechanism 140.

Generally speaking, network 102 provides a programming signal to broadcast station 110 via satellite. The signal conveyed by network 102 typically includes both television programming and advertisements ("ads"). In addition, the signal conveyed by network 102 includes a cue which indicates that an advertisement is forthcoming. Broadcast station 110 receives the signal conveyed by network 102. Cue detection unit 112 is configured to detect the cues which are present in the network signal and convey the information contained in the cue to ad insertion source 114. Cue detection unit 112 further conveys the received television programming signal to transmission unit 120. If ad insertion source 114 has a local advertisement which corresponds to a received cue, it may convey that advertisement to transmission unit 120. Alternatively, if no local advertisement corresponding to the received cue is available, ad insertion source 114 may convey cue information indicating an unused avail to transmission unit 120. Further, ad stream source 116 conveys a stream of advertisements 117 to transmission unit 120. Transmission unit 120 conveys the signals and data received from cue detection unit 112, ad insertion source 114, and ad stream source 116 to receiver 130 via satellite. Ad selector mechanism 140 is configured to detect cues within the signal received from broadcast station 110. If ad selector mechanism 140 detects an upcoming unused avail, it selects an advertisement from the ad stream in the received broadcast signal to fill the unused avail.

Numerous alternative configurations of system 100 are possible as well. For example, ad stream source 116 may correspond to ad server 850 and may be located at network 102 or elsewhere in the broadcast chain. Additionally, in one embodiment broadcast station 110 does not utilize ad insertion source 114 for inserting ads. Instead, broadcast station 110 may be configured to convey all cues received from network 102 directly to receiver 130. Receiver 130 would then handle the insertion of all ads, not just those related to unused avails. Further, any suitable means of transmitting network and broadcast signals is contemplated as well. For example, these signals may be transmitted via microwave, fiber optic cable, or otherwise.

Ad Streams and Staggered Ads

FIG. 4A is an illustration of one embodiment of an ad stream 1100 which may be delivered by ad stream source 116. Ad stream 1100 includes two streams of ads, 1101 and 1102. Included in streams 1101 and 1102 are ads corresponding to three advertisers A, B and C. Advertiser A has provided ads A1, A2, A3 and A4. Advertiser B has provided ads B1, B2 and B3. Advertiser C has provided ads C1, C2 and C3. Each of the ads in streams 1101 and 1102 may be transmitted in a carousel fashion. In the example shown in FIG. 4A, a viewer may interact with an ad in a television page at time A 1120. For example, as illustrated in FIG. 1, a banner ad 870 may appear on a page 860. If the viewer is interested in the product or service advertised by the banner ad 870 and wishes further information, the viewer may indicate this interest by selecting the banner ad 870 using a remote control, or other device (e.g., point-and-click on the banner ad 870). As an example, the banner ad 870 may correspond to advertiser B. By indicating interest in the banner ad 870, further information related to the advertiser corresponding to banner 870 may be presented to the viewer. In one embodiment, the banner ads 870 which are initially displayed are not directly determined by a viewer selection, but may be determined by the broadcaster. Further, if there were more than one upcoming ad which corresponds to advertiser B, the ad which is selected for display may be selected utilizing a profile of the viewer. For example, user profile information may be stored in a set top box of the viewer as discussed below. Upon displaying a particular ad, information regarding its presentation may be conveyed back to the headend for tracking and accounting purposes. Such information may be conveyed immediately, or may be stored and conveyed at a later time. In one embodiment, set top boxes are periodically polled by the headend for stored information.

Figure 4B:
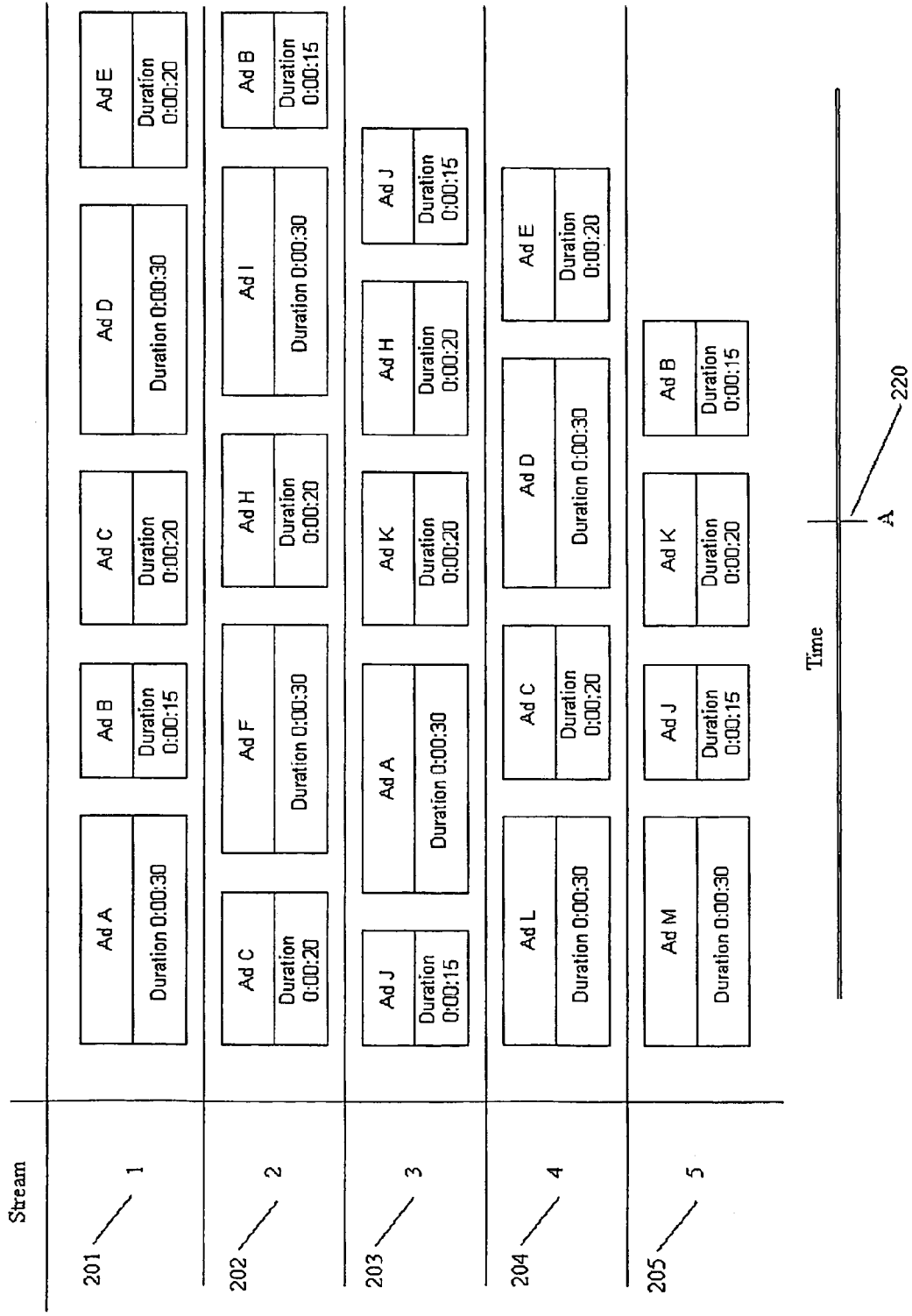
FIG. 4B is a diagram illustrating an ad stream.

Turning now to FIG. 4B, another embodiment of an ad stream 117 delivered by ad stream source 116 is illustrated. In the embodiment shown, ad stream 117 includes five streams of advertisements 201-205. Each of streams 201-205 includes a number of advertisements of differing duration. For example, stream 201 includes ads A with a duration of 30 seconds, ad B with duration 15 seconds, ad C with duration 20 seconds, ad D with duration 30 seconds, and ad E with duration 20 seconds. Stream 202 includes ads C, F, H, I and B. Stream 203 includes ads J, A, K, H and J. Stream 204 includes ads L, C, D and E. Stream 205 includes ads M, J, K and B. As shown in the illustration, time may be seen to progress from right to left. In the exemplary embodiment shown in FIG. 4, certain ads appear in more than one of streams 201-205. Further, certain ads appear more than once in a given stream. For example, ad A appears in stream 201 and stream 203. Also, ad J appears twice in stream 203 and once in stream 205. In general, any sequence or combination of ads may be used in streams 201-205. Certain configurations may have advantages as will be discussed below. Further, any number of streams of ads may be included in ad stream 117.

In the embodiment of FIG. 4, a cue 220 at time A may be conveyed in the signal broadcast by broadcast station 110. In one embodiment, cue 220 may indicate an upcoming unused avail. In addition, the cue 220 may include information indicating when the unused avail is to occur as well as its duration. Ad selector mechanism 140 is configured to detect this cue 220 and search streams 201-205 for ads which begin at approximately the time of the upcoming unused avail. In one embodiment, each of the ads in streams 201-205 include information about their respective start times and durations, as well as those of ads which follow them in their respective streams. Of those ads which are identified as beginning at the appropriate time, ad selector mechanism 140 examines them to determine whether they are of the appropriate length. Ad selector mechanism 140 may then select one or more ads from those identified for filling the upcoming unused avail. In one embodiment, the selected ads are extracted from the received ad stream 117 and displayed on the television when the unused avail occurs.

It should be noted, that by staggering the placement of a particular ad across different streams 201-205 at different start times, the probability of that ad being an appropriate candidate for an unused avail is increased. Further, by increasing the frequency of a particular ad in one or more streams, the probability of an ad being selected as an appropriate candidate is increased. In one embodiment, ad selector mechanism 140 may be configured to select candidate ads from ad stream 117 based on further criteria. For example, receiver 130 may be configured to store information identifying the user of that receiver 130 as belonging to a particular group or having particular preferences. In one example, demographic information or other preference information may be obtained from the user of receiver 130 and stored therein. Upon making ad selections for unused avails, ad selector mechanism 140 may then utilize the information stored in receiver 130 in selecting more suitable ads. For example, if the information in receiver 130 indicates the user of that receiver 130 is a sports fan, an ad related to sports may be selected by ad selector mechanism 140 in preference to another ad. Advantageously, ads may be selectively targeted to viewers.

As an alternative to filling of unused avails, the streams 201-205 may be used in conjunction with a viewer's interaction as described in FIG. 4A. For example, time A 220 may indicate a viewer's selection of a banner ad corresponding to a particular advertiser. An ad corresponding to that advertiser may then be selected from one of streams 201-205. Utilizing a viewer profile, the most appropriate ad corresponding to that advertiser may chosen. By using a staggering of ads as described above, the probability of having the most appropriate ad available in a timely manner is increased. Advantageously, improved targeting of ads may be attained.

Figure 5:
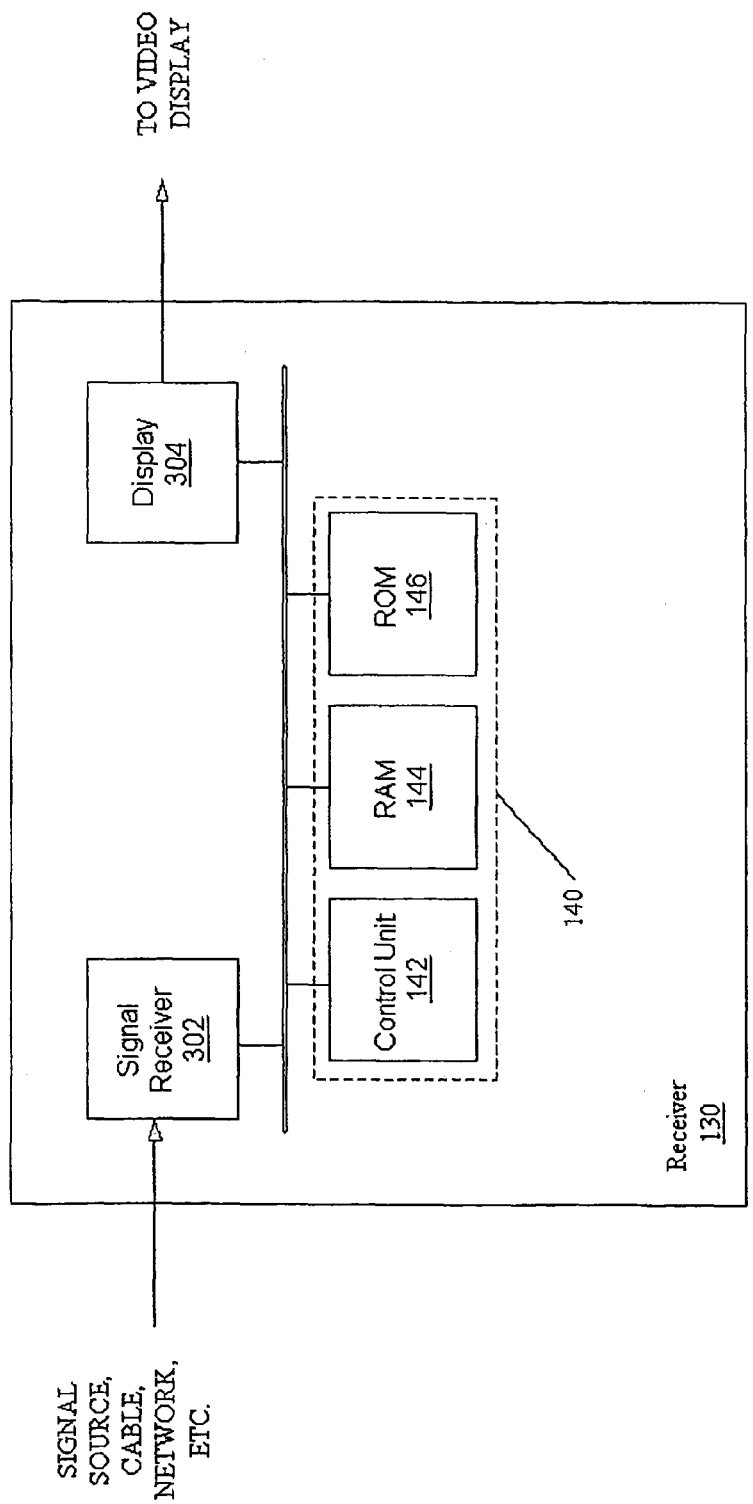
FIG. 5 illustrates one embodiment of a receiver.

FIG. 5 is one embodiment of a receiver 130 employing the ad selector mechanism 140 described above. In the embodiment shown, receiver 130 includes a signal receiver 302, ad selector mechanism 140, and display unit 304. Ad selector mechanism 140 includes a control unit 142, RAM 144, and ROM 146. Signal receiver 302 is coupled to a signal source such as a satellite broadcast signal, cable, or network connection (e.g., an Internet connection). In one embodiment, receiver 130 may be part of a computing system or other computing device and signal receiver 302 may comprise a network interface card or similar device. Finally, display unit 304 is coupled to a display device such as a television or computer monitor.

In one embodiment, signal receiver 302 is configured to receive a signal from a signal source. Included in the signal received by signal receiver 302 are programs, an ad stream, and cues. Signal receiver 302 is configured to convey received cues and the ad stream to control unit 142, and a programming stream to display unit 304. RAM 144 and ROM 146 contain program instructions which are utilized by control unit 142 to perform ad selection functions. Upon detecting a cue which indicates an upcoming unused avail, its start time and duration, control unit 142 is configured to search the received ad stream for ads as described above and identify one or more ads for display. When the unused avail time occurs, the control unit is configured to convey the selected ads to display unit 304. Display unit 304 is configured to convey the received programs and ads to a display device, such as a television or computer monitor. Numerous embodiments of ad selector mechanism 140 are possible. For example, ad selector mechanism 140 may comprise a general purpose processor executing instruction code, an application specific integrated circuit, a programmable gate array, or combinations of any of the above. Further, instruction code executable for implementing the above described embodiment may be created independently of the hardware upon which it is intended to execute. The created instruction code may then be conveyed to various hardware manufacturers, vendors, or others for use in a hardware device.

Ad Selection in an Interactive Television Environment

As discussed above, interactive television systems provide a means to deliver interactive content as well as ordinary television audio and video to a large number of subscribers. Because interactive television allows viewers to interact with programming and advertisements at unpredictable times, advertisers have not been able to effectively provide ads at the appropriate times. By utilizing an embodiment of the ad selector mechanism 140 described above, ads may be delivered to viewers at times which better correspond to the actions and desires of the viewer, rather than the predetermined times of the network or broadcaster. Advantageously, in addition to being used to fill unused avails as described above, the ad selector mechanism 140 may be used to provide targeted ads at as described below.

Figure 6:
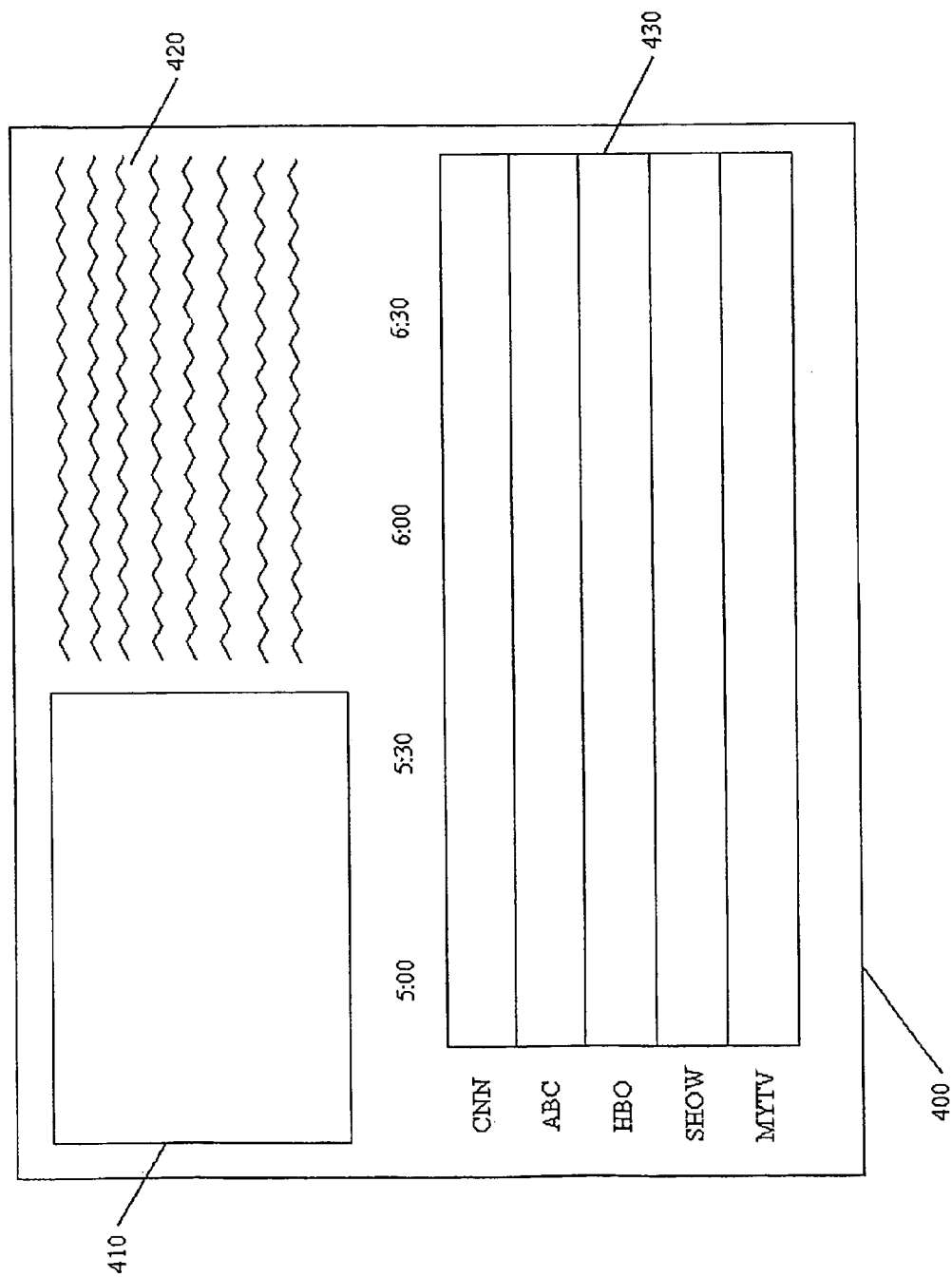
FIG. 6 is an illustration of a program guide.

To illustrate how the ad selector mechanism may be further used in an interactive television system, FIG. 6 shows an interactive television program guide (IPG) 400. IPG 400 includes a program schedule 430, program description 420, and an advertising window 410. In a interactive television system, viewers may interact with IPG 400 in ways they may not be able to in a non-interactive television environment. For example, advertisement window may display a stream of advertisements. If a viewer finds a particular advertisement interesting, the viewer may wish to receive more information related to that advertisement. The viewer may then wish to select the advertisement with a remote control or other device and receive further information. However, in a prior art system, the timing of advertisements may be predetermined and not coincide with the timing of the viewer's selection. Consequently, the advertiser is not able to meet the viewer's desire for more information at the time the viewer desires the information. By utilizing the ad selector mechanism 140 described above, problems like the above may be solved. Ad selector mechanism 140 may detect the type of ad selected by the viewer, select an ad from ad stream 117 which is received by signal receiver 302 and which corresponds to the selected ad, and provide that ad to the viewer in a timely manner. Advantageously, the viewer is able to receive the information when desired and the advertiser is able provide more information to a viewer who has expressed further interest in their product or service. While a television program guide is described above, numerous examples of providing advertising within an interactive service are possible and are contemplated.

Figure 7:
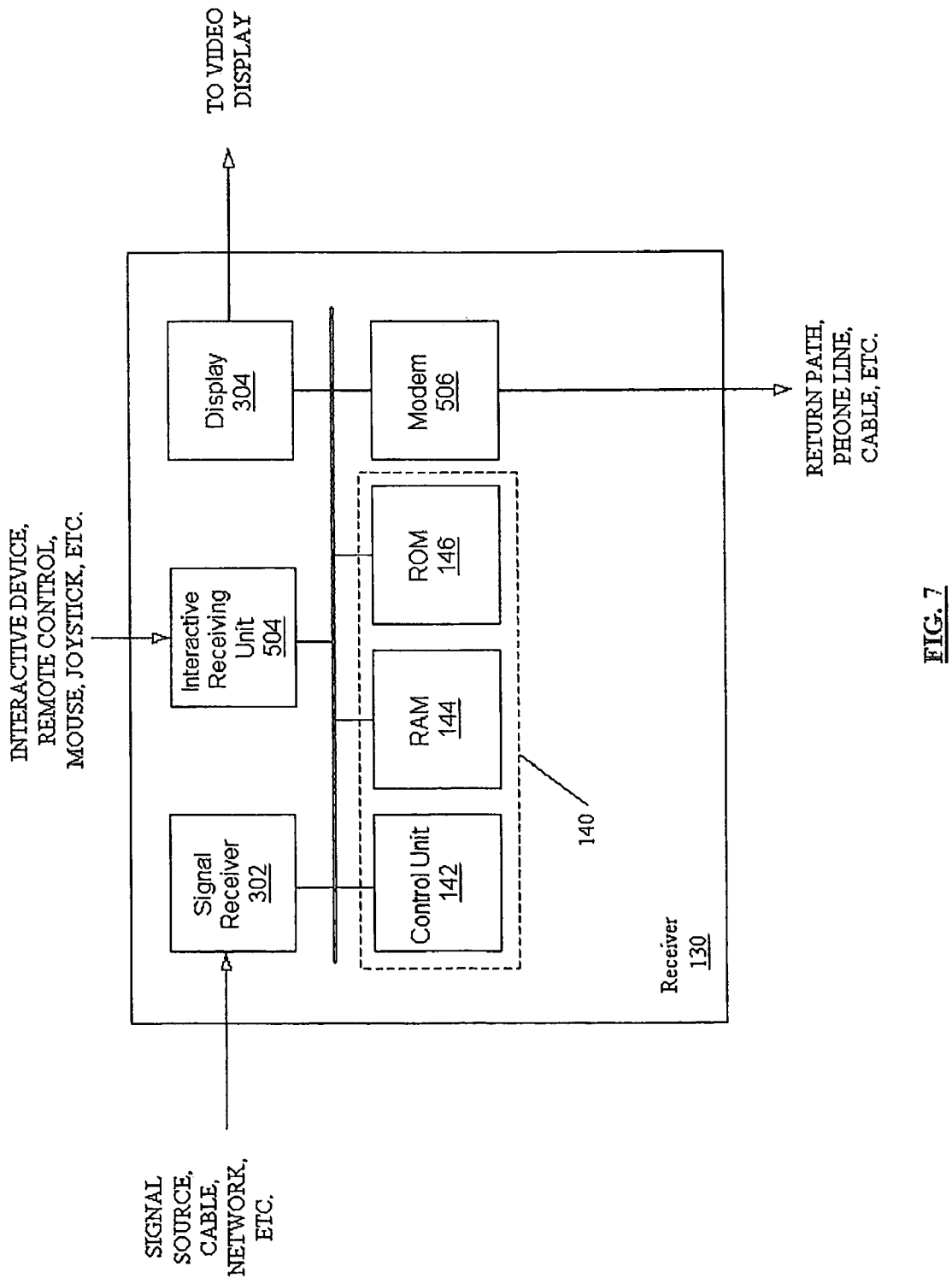
FIG. 7 illustrates one embodiment of an interactive receiver.

FIG. 7 is one embodiment of a receiver 130 which may be used in an interactive television system. Included in the receiver 130 of FIG. 6 is an ad selector mechanism 140, display unit 304, modem 506, and interactive receiving unit 504. As discussed above in the description of FIG. 4, in one embodiment control unit 142 may be configured to detect cues which are received by signal receiver 302. Interactive receiving unit 504 is configured to receive input from a viewer. For example, a viewer may utilize an infrared remote control which is detected by interactive receiving unit 504. Alternatively, a viewer may utilize an input device in a computing system, such as a mouse, writing tablet, voice, or other device which is detected by interactive receiving unit 504. Many other possible viewer input devices are possible and are contemplated. When a viewer interacts with an interactive service, such interaction may be detected by interactive receiving unit 504 and conveyed to control unit 142. Control unit 142 acts upon the conveyed input in a similar manner to cues which are received and conveyed by signal receiver 302. In response to the viewer's input, control unit 142 may then search the ad stream received by signal receiver 302 for an ad which corresponds to the viewer's input. Further, by including corresponding ads in the ad stream at multiple start times and/or across multiple streams, a corresponding ad may be quickly selected and displayed.

In one embodiment, control unit 142 may utilize indicators such as the channel currently being viewed, the time of day, and other viewer specific data which may currently exist within RAM 144 in selecting an ad from the ad stream which best suits the particular viewer. For example, selections made by a viewer may be registered and stored by receiver 130 in RAM 144. This stored information may indicate the preferences or demographics of the viewer and be utilized by control unit 142 in selecting an ad from the ad stream. Further, the selections made by the viewer, or stored information, may be conveyed back to a broadcaster via modem 306. The broadcaster may then utilize this information in selecting and scheduling which ads to convey in ad stream 117. For example, if viewer selections indicate higher interest in sporting events on Monday nights, more sports related ads may be included in ad stream 117 on Monday nights. Advantageously, improved targeting of ads may be achieved, in addition to meeting the timing needs of the viewer.

Figure 8:
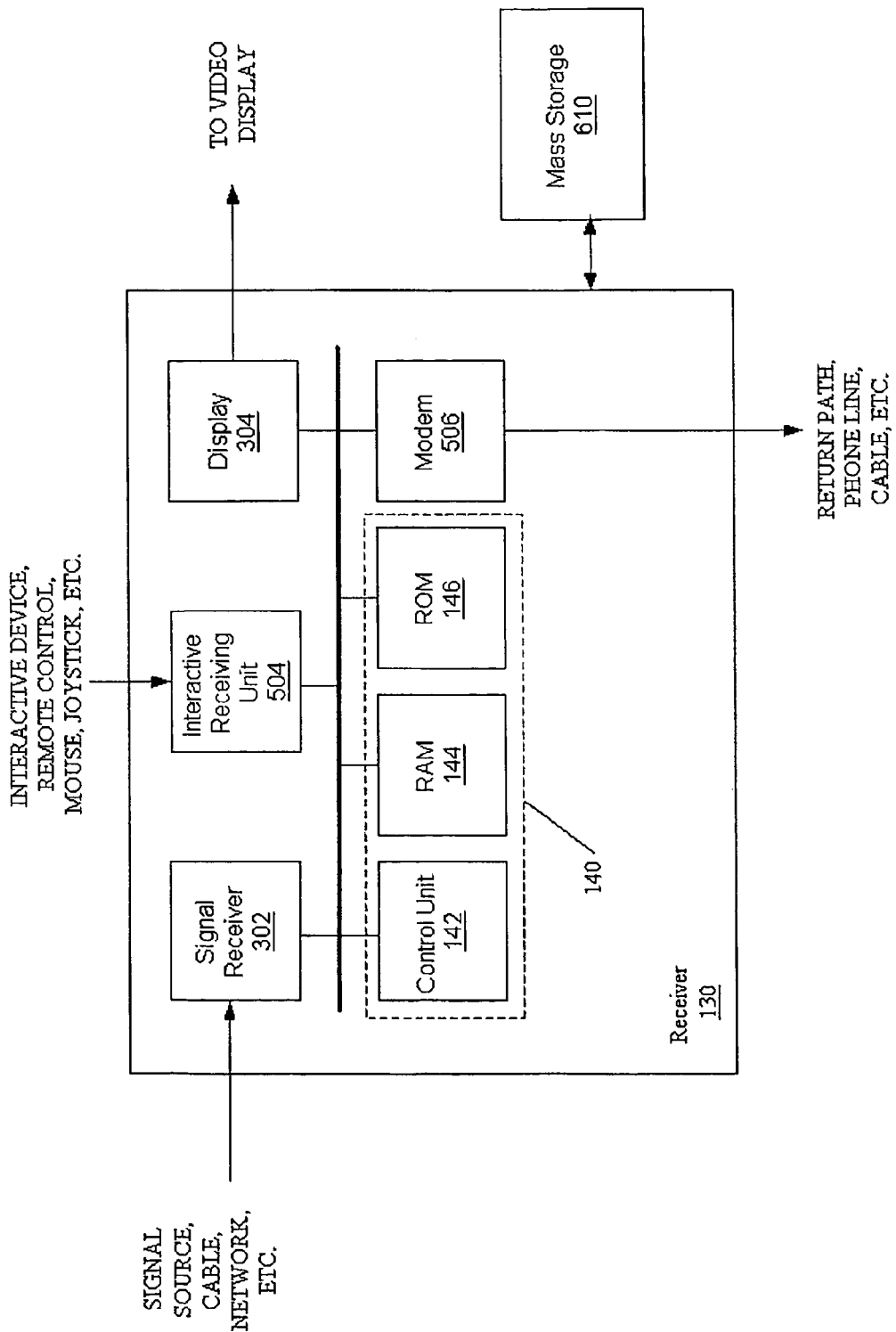
FIG. 8 illustrates one embodiment of an interactive receiver.

FIG. 8 shows an alternative embodiment of the invention. In the embodiment of FIG. 8, receiver 130 is coupled to a mass storage device 610. Mass storage 610 may include a hard disk, CDROM, DVD, RAM, or other storage. In one embodiment, receiver 130 is configured to store ads from ad stream 117 which are selected by ad selector 140 in response to viewer input. For example, a viewer may wish to receiver further information related to an ad which is currently being displayed. However, the viewer may also wish to switch to an alternate channel to view a particular program. The viewer may make a selection corresponding to the displayed ad. Ad selector 140 may then select an ad from ad stream 117 which corresponds to the viewer's selection. However, rather than conveying the selected ad to the viewer's display, the ad is conveyed to mass storage 610 where it is stored. Alternatively, the selected may be displayed. Upon display the viewer may indicate with a selection device that they wish the ad to be saved for later viewing. Advantageously, the viewer may later retrieve and view the stored ad at a more convenient time. Further, information regarding selections made by the viewer may be stored on mass storage device 610 for later transmission via the return path. This returned information may then be used in further profiling of viewers, scheduling of ads, and ad tracking accounting. In one embodiment, receiver 130 includes a processor configured to execute program instructions in accomplishing the above described invention. In one embodiment, the program instructions may comprise an operating system, application programs, or combinations of both. Additionally, the program instructions may be stored in RAM, other volatile storage, or non-volatile storage.

Figure 9:
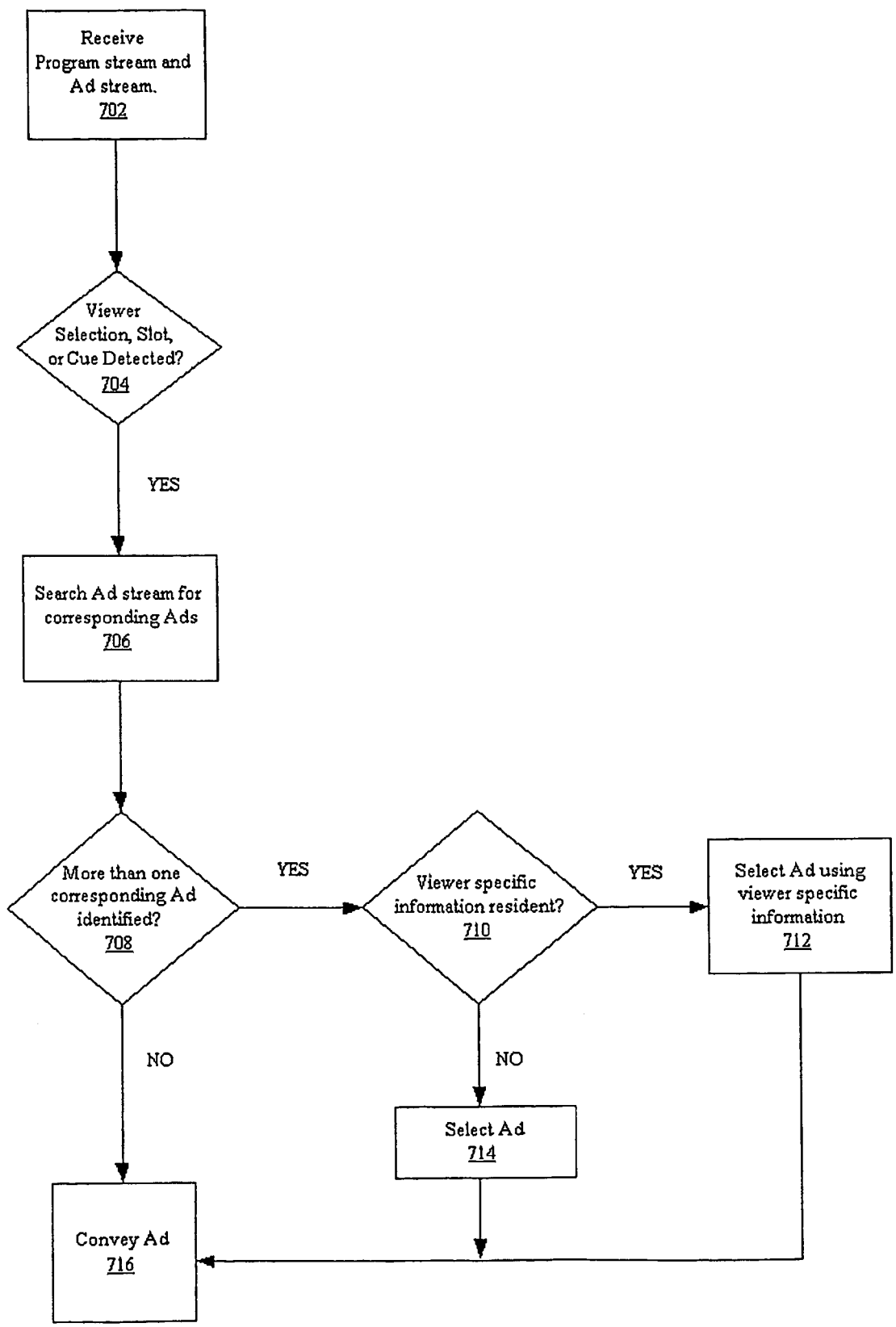
FIG. 9 is a flowchart illustrating one embodiment of the invention.

FIG. 9 shows a flow diagram illustrating a method implementing one embodiment of the invention. A program stream and an ad stream are received (block 702). If a viewer selection, an application page slot, or a cue is detected (decision block 704), the ad stream is searched for ads which correspond to the selection or cue (block 706). If only one corresponding ad is identified (decision block 708), the identified ad is conveyed to a display device or storage device (block 716). However, if more than one corresponding ad is identified (decision block 708), a determination is made as to whether any viewer specific information is resident (decision block 710). This information may be contained in the received broadcast signal, in RAM or some other storage device. If viewer specific information is resident (decision block 710), one of the identified ads is selected using the viewer specific information (block 712). For example, if the viewer specific information indicates the viewer is a sports fan, an ad may be selected which has a sports related theme. The selected ad is then conveyed (block 716). Alternately, if no viewer specific information is resident (decision block 710), an ad may be selected from those identified in a random, or any other suitable manner. The selected ad is then conveyed (block 716).

Figure 10:
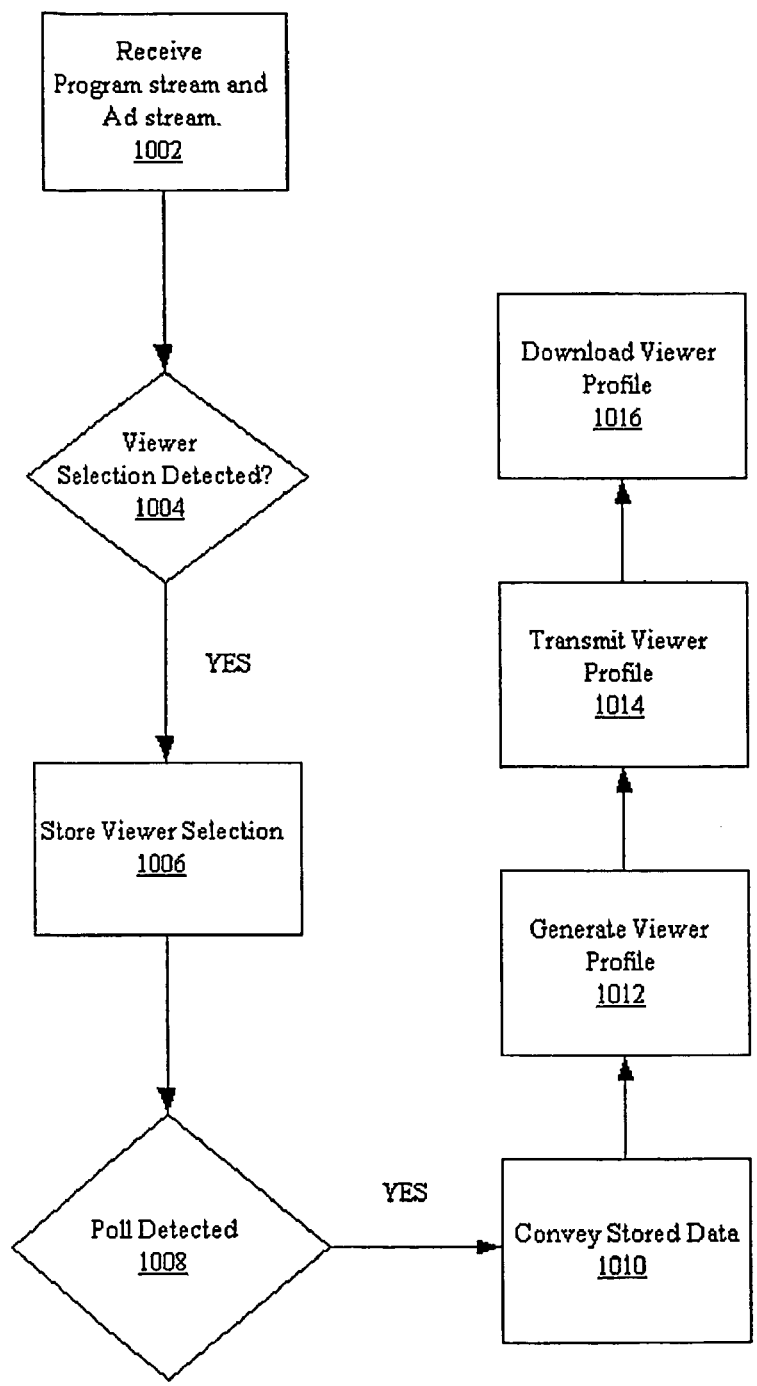
FIG. 10 is a flowchart illustrating one embodiment of viewer profile creation.

FIG. 10 shows a flow diagram illustrating one embodiment of a method to create a viewer profile. In the embodiment shown, a programming stream and ad stream are received (block 1002). If a viewer selection is detected (decision block 1004), the selection is stored (block 1006). In one embodiment, viewer selections may include programming selections and/or ad selections. Viewer selections may be stored in RAM, a hard drive, or any other suitable storage medium. In the embodiment shown in FIG. 10, the headend periodically polls (decision block 1008) the device containing the storage medium to determine if selection data has been stored therein. Subsequently, the stored data is conveyed to the headend (block 1010) where a viewer profile is created (block 1012). The created viewer profile is then transmitted to the viewer's location (block 1014) where it is downloaded (block 1016). The downloaded viewer profile may then be used for selecting ads for presentation to the viewer, Advantageously, targeting of ads to viewers may be achieved.

Virtual Channels

In a further embodiment, the above described mechanism may be used to create viewer targeted ad channels. By gathering information on a viewer as described above, a viewer profile may be developed. This profile may be used to select ads which best suit the particular viewer as described above. However, rather than selecting ads in response to cues or viewer selections, ads may be selected on a continuous basis from the received ad stream 117 and conveyed to a predetermined channel, window within a channel, or storage device, Advantageously, a viewer may be able to tune to a predetermined channel where advertisements that meet that viewer's profile are continuously displayed. In this manner, the viewer is able to see those ads in which they may have an interest and not those in which they have no interest. Further, advertisers are better able to reach those viewers which have the most interest in their products or services. Alternatively, the viewer specific ads may be streamed to a window within a channel, such as the window 410 of FIG. 5. In addition, multiple viewer profiles may be maintained an utilized to create multiple viewer specific ad channels. In such an embodiment, different viewers may utilize a remote control or other device to indicate, who is currently watching television. Multiple viewer profiles may then be created and used to create multiple virtual ad channels. Advantageously, a first viewer may have a particular channel or window which displays ads corresponding to their profile, while a second channel or window displays ads targeted to a second viewer. In this manner, the ad stream 117 may be viewed as including multiple, targeted channels corresponding to different types of viewers.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, RDRAM, SRAM, etc.), ROM, etc. as well as transmission media or signals such as electrical, electromagnetic, or digital signals, conveyed via a communication medium such as network and/or a wireless link.

While the present invention has been described with reference to particular embodiments, it will be understood that the embodiments are illustrative and that the invention scope is not limited to these embodiments. For example, while discussed in terms of television systems, the invention may also be used in the context of a device coupled to the Internet, such as a personal computer or video game platform. In such an embodiment, a user may have a broadband connection to the Web, such as via cable modem or DSL, Many variations, modifications, additions and improvements to the embodiments described are possible. These variations, modifications, additions and improvements may fall within the scope of the invention as detailed within the following claims.

What is claimed is:

1. A method of ad selection comprising:
   receiving at a receiver, a programming signal and a plurality of ads;
   the receiver detecting a request, wherein detecting said request comprises detecting a cue which identifies an avail as an unused avail, the cue including data inserted by a local provider that indicates the local provider has not inserted an alternative advertisement in place of a network provided advertisement for the avail;
   the receiver identifying a first ad of said plurality of ads in response to detecting said request;
   the receiver selecting said first ad; and
   the receiver conveying said first ad.

2. The method of claim 1, wherein said plurality of ads comprise a plurality of streams of ads.

3. The method of claim 2, wherein said plurality of streams of ads are received via a broadcast signal.

4. The method of claim 1, wherein detecting said request comprises detecting a slot for an ad in an application page.

5. The method of claim 1, wherein said detecting said request comprises detecting a viewer selection.

6. The method of claim 1, wherein said cue comprises information indicative of a start time and duration of said unused avail.

7. The method of claim 6, wherein said plurality of ads are received in a stream including information indicative of an ad start time and ad duration of each of said plurality of ads, and wherein said identifying comprises searching said plurality of ads for ads which have an ad start time and ad duration appropriate for use in the unused avail.

8. The method of claim 1, wherein said first ad is identified based on a viewer profile.

9. The method of claim 8, wherein said first ad is tagged with profile data, and wherein said first ad is said identified by matching said profile data with said viewer profile.

10. The method of claim 1, wherein said conveying comprises inserting said first ad in an application page to form a combined image and displaying said combined image on a display device.

11. The method of claim 1, wherein said conveying comprises displaying said first ad as a full screen image on a display device.

12. The method of claim 1, wherein said conveying comprises storing said first ad on a storage device.

13. The method of claim 12, further comprising retrieving said stored first ad from said storage device.

14. The method of claim 1, further comprising storing information corresponding to said request on a storage device as a first data.

15. The method of claim 14, further comprising conveying said first data to a remote repository.

16. The method of claim 15, further comprising utilizing said conveyed first data to create a viewer profile, wherein said created viewer profile is transmitted to a viewer location and is used in said identifying said first ad at said viewer location.

17. The method of claim 1, wherein said first ad corresponds to an application of a content provider, and wherein said first ad corresponds to an advertiser.

18. The method of claim 17, wherein said first ad further corresponds to a brokered agreement, wherein said brokered agreement comprises a first agreement between said content provider and a broker, and a second agreement between said advertiser and said broker.

19. The method of claim 3, wherein a first stream of said plurality of streams includes a first occurrence of said first ad, and wherein a second stream of said plurality of streams includes a second occurrence of said first ad, wherein said first stream and said second stream are received concurrently, and wherein a position of said first ad in said first stream is not equal to a position of said first ad in said second stream.

20. The method of claim 19, wherein said identifying said first ad comprises identifying said first ad in said first stream and said second stream, and wherein said selecting said first ad comprises selecting said first occurrence of said first ad in response to detecting neither said first occurrence nor said second occurrence of said first ad have begun and said first occurrence of said first ad precedes said second occurrence in time.

21. An ad selection device comprising:
a signal receiver, wherein said signal receiver is configured to receive a programming signal and a plurality of ads; and
an ad selector mechanism coupled to said receiver, wherein said ad selector mechanism is configured to:
detect a request, wherein detecting said request comprises detecting a cue which identifies an avail as an unused avail, the cue including data inserted by a local provider that indicates the local provider has not inserted an alternative advertisement in place of a network provided advertisement for the avail;
identify a first ad of said plurality of ads in response to detecting said request;
select said first ad; and
convey said first ad.

22. The device of claim 21, wherein said plurality of ads comprise a plurality of streams of ads.

23. The device of claim 22, wherein said plurality of streams of ads are received via a broadcast signal.

24. The device of claim 21, wherein detecting said request comprises detecting a slot for an ad in an application page.

25. The device of claim 21, wherein said detecting said request comprises detecting a viewer selection.

26. The device of claim 21, wherein said cue comprises information indicative of a start time and duration of said unused avail.

27. The device of claim 26, wherein said plurality of ads are received in a stream including information indicative of an ad start time and ad duration of each of said plurality of ads, and wherein said identifying comprises searching said plurality of ads for ads which have an ad start time and ad duration appropriate for use in the unused avail.

28. The device of claim 21, wherein said first ad is identified based on a viewer profile.

29. The device of claim 28, wherein said first ad is tagged with profile data, and wherein said first ad is said identified by matching said profile data with said viewer profile.

30. The device of claim 21, wherein said conveying comprises inserting said first ad in an application page to form a combined image and displaying said combined image.

31. The device of claim 21, wherein said conveying comprises displaying said first ad as a full screen image on a display device.

32. The device of claim 21, wherein said conveying comprises storing said first ad on a storage device.

33. The device of claim 32, wherein said ad selector mechanism is further configured to retrieve said stored first ad from said storage device.

34. The device of claim 21, wherein said ad selector mechanism is further configured to store information corresponding to said request on a storage device as a first data.

35. The device of claim 34, further comprising conveying said first data to a remote repository.

36. The device of claim 35, wherein said conveyed first data is utilized to create a viewer profile, wherein said created viewer profile is transmitted to said ad selection device and is used to said identify said first ad by said ad selection device.

37. The device of claim 21, wherein said first ad corresponds to an application of a content provider, and wherein said first ad corresponds to an advertiser.

38. The device of claim 37, wherein said first ad further corresponds to a brokered agreement, wherein said brokered agreement comprises a first agreement between said content provider and a broker, and a second agreement between said advertiser and said broker.

39. The device of claim 23, wherein a first stream of said plurality of streams includes a first occurrence of said first ad, and wherein a second stream of said plurality of streams includes a second occurrence of said first ad, wherein said first stream and said second stream are received concurrently, and wherein a position of said first ad in said first stream is not equal to a position of said first ad in said second stream.

40. The device of claim 39, wherein said identifying said first ad comprises identifying said first ad in said first stream and said second stream, and wherein said selecting said first ad comprises selecting said first occurrence of said first ad in response to detecting neither said first occurrence nor said second occurrence of said first ad have begun and said first occurrence of said first ad precedes said second occurrence in time.

41. The device of claim 21, wherein said device comprises a set top box.

42. A computer readable storage medium comprising program instructions, wherein the program instructions are executable to:
receive a programming signal and a plurality of ads;
detect a request, wherein detecting said request comprises detecting a cue which identifies an avail as an unused avail, the cue including data inserted by a local provider that indicates the local provider has not inserted an alternative advertisement in place of a network provided advertisement for the avail;
identify a first ad of said plurality of ads in response to detecting said request;
select said first ad; and
convey said first ad.

43. The storage medium of claim 42, wherein said program instructions are further executable to:
store requests as a first data;
convey said first data;
receive a viewer profile; and
utilize said viewer profile in identifying ads.

44. A method comprising:
receiving at a broadcast station operated by a local provider, a first programming signal from a network provider, the first programming signal comprising a network provided advertisement and a corresponding cue indicative of an avail;
determining an alternative advertisement will not be inserted by the local provider for the avail;
the local provider inserting in a second programming signal the network provided advertisement and data which indicates the network provided advertisement corresponds to an unused avail, the data further indicating the local provider has not inserted an alternative advertisement in place of a network provided advertisement for the avail; and conveying said second programming signal from the local provider to a plurality of end users.

45. The method of claim 44, wherein said second programming signal is included in a television broadcast signal.

46. The method of claim 45, wherein said broadcast signal comprises a plurality of ads.

47. The method of claim 46, wherein said plurality of ads comprises a plurality of streams of ads, wherein a first stream of said plurality of streams includes a first occurrence of a first ad, and wherein a second stream of said plurality of streams includes a second occurrence of said first ad, wherein a position of said first ad in said first stream is not equal to a position of said first ad in said second stream.

* * * * *